United States Patent [19]
Andreola et al.

[11] Patent Number: 5,643,968
[45] Date of Patent: Jul. 1, 1997

[54] PROCESS FOR PRODUCING ION EXCHANGE MEMBRANES, AND THE ION EXCHANGE MEMBRANES PRODUCED THEREBY

[75] Inventors: Christopher Andreola, Morristown; Frederick P. Chlanda, Rockaway; Jian-Ping Huang, Morris Plains, all of N.J.

[73] Assignee: The Graver Company, Union, N.J.

[21] Appl. No.: 345,017

[22] Filed: Nov. 23, 1994

Related U.S. Application Data

[63] Continuation of Ser. No. 6,010, Jan. 15, 1993, abandoned.

[51] Int. Cl.$^6$ .............................. C08J 5/20; C08G 65/48
[52] U.S. Cl. .................. 521/27; 521/30; 525/390; 525/391; 525/534; 525/535
[58] Field of Search .................. 521/27, 30; 525/390, 525/391, 534, 535

[56] References Cited

U.S. PATENT DOCUMENTS

| | | | |
|---|---|---|---|
| 3,247,133 | 4/1966 | Chen | 521/27 |
| 3,258,435 | 6/1966 | Imoto et al. | 521/27 |
| 3,663,507 | 5/1972 | Vogel et al. | 525/534 |
| 3,784,460 | 1/1974 | Le Bras et al. | 204/301 |
| 3,925,511 | 12/1975 | Loveless | 260/877 |
| 4,012,324 | 3/1977 | Gregor | 210/500 M |
| 4,101,395 | 7/1978 | Motani et al. | 204/98 |
| 4,113,795 | 9/1978 | Izawa et al. | 260/874 |
| 4,198,492 | 4/1980 | Izawa et al. | 525/392 |
| 4,256,862 | 3/1981 | Binsack et al. | 525/534 |
| 4,278,777 | 7/1981 | Jakabhazy et al. | 525/276 |
| 4,604,208 | 8/1986 | Chu et al. | 210/636 |
| 4,634,742 | 1/1987 | Percec | 525/390 |
| 4,797,187 | 1/1989 | Davis et al. | 204/180.2 |
| 4,797,457 | 1/1989 | Guiver et al. | 525/534 |
| 4,833,219 | 5/1989 | Guiver | 525/534 |
| 4,851,455 | 7/1989 | Job et al. | 522/139 |
| 4,883,573 | 11/1989 | Voss et al. | 204/182.4 |
| 4,894,159 | 1/1990 | Guiver et al. | 525/534 |
| 4,895,634 | 1/1990 | Giuffre et al. | 521/27 |
| 5,021,160 | 6/1991 | Wolpert | 210/500.35 |
| 5,300,228 | 4/1994 | Sugaya et al. | 210/638 |

FOREIGN PATENT DOCUMENTS

| | | |
|---|---|---|
| 227968 | 10/1985 | Germany . |
| 62-115037 | 5/1987 | Japan . |
| 62-193604 | 8/1987 | Japan . |
| 63-001406 | 1/1988 | Japan . |

OTHER PUBLICATIONS

Synthetic Polymeric Membranes by R.E. Kesting, McGraw-Hill Book Co., New York (1971) and more recently by T. Santa in Pure & Appln. Chem. 58 (1986).

Chalk and Hoogeboom, Anionic Graft Polymerization of Lithiated Poly(2,6–di–methyl–1,4–phenylene Ether), J. Poly. Sci.: Part.A–1, vol. 7, 2537–2545 (1969).

Novel Polysulfones for Membrane Applications, M.D. Guiver et al. Proc. of the Int. Membrane Conf. on the 25th Anniv. of Memb. Res. in CA, Sep. 1986, 187–202.

*Primary Examiner*—Helen Lee
*Attorney, Agent, or Firm*—Keck, Mahin & Cate

[57] ABSTRACT

The present invention relates to ion exchange membranes comprising soluble graft copolymer comprising a backbone of a first polymer having a main chain containing aromatic rings and a polymerizable vinyl or ring containing compound which contains at least one functional group which displays ion exchange functionality or may be converted to display ion exchange functionality, which is grafted onto said first polymer on at least one of said aromatic rings or on at least one benzylic carbon atom of said aromatic rings. The copolymer components may be selected to produce membranes for a variety of uses including electrodialytic processes such as electrodialytic concentration and separation processes, electrodialytic water splitting, electrolysis or electrolytic splitting of water and fuel cells for electrical generation; and pressure or chemical potential driven membrane processes such as ultrafiltration, reverse osmosis, piezodialysis, diffusion dialysis and pervaporation. The ion exchange membranes of the present invention display excellent mechanical properties, electrical and mechanical stability to oxidizing acids, good permselectivity and resistance to fouling. Process for making said graft copolymers, and process for making specific graft copolymers are also disclosed.

15 Claims, No Drawings

PROCESS FOR PRODUCING ION EXCHANGE MEMBRANES, AND THE ION EXCHANGE MEMBRANES PRODUCED THEREBY

This application is a continuation of application Ser. No. 08/006,010 filed Jan. 15, 1993, now abandoned.

BACKGROUND OF THE INVENTION

The present invention relates to the field of ion exchange membranes. Ion exchange membranes contain functional groups bearing positive and/or negative ionic charges fixed to a matrix. The synthesis, properties and uses of such membranes has been reviewed in *Synthetic Polymeric Membranes* by R. E. Kesting, McGraw-Hill Book Company, New York (1971) and more recently by T. Sata in *Pure & Appl. Chem.*, 58, 1613 (1986). The ionic nature of these materials make them hydrophilic and they find use in a variety of separation processes in which water is one of the principle components, including electrodialytic processes such as electrodialytic concentration and separation processes, electrodialytic water splitting, electrolysis or electrolytic splitting of water, fuel cells for electricity generation and pressure or chemical potential driven membrane processes such as ultrafiltration, reverse osmosis, piezodialysis, diffusion dialysis and pervaporation. For example, U.S. Pat. No. 4,012,324 describes the use of ion exchange membranes for use in ultrafiltration and points out the advantages of these membranes with respect to fouling resistance. Ion exchange membranes of the charge mosaic type are required for piezodialysis, a pressure driven system capable of separating salts from uncharged materials. Ion exchange membranes have also been used for drying of gases and liquids.

The configuration of equipment used for various membrane processes also varies widely. Electrodialytic processes are almost exclusively carded out with flat sheets of membranes arrayed between planar electrodes. The pressure driven processes are more likely to be carded out in a more compact configuration of either spiral wound or hollow fiber units.

While each application of ion exchange membranes has some specific requirements and one property or another may be more important depending on the application and the type of equipment in which the membranes are mounted, there are some properties which are generally desirable. Chemical stability, not only to the normal process streams but also to possible cleaning agents is essential. Mechanical strength and resistance to compaction are desirable. Ease of membrane formation and control of properties are also highly desirable.

Ion exchange membranes have been produced via graft polymerization. Early examples of this type of membrane synthesis involved thermal methods, usually in the presence of crosslinking agents to insure adherence of the graft to the backbone. More recently, radiation grafting of films with ionic monomers or their precursors has been studied more extensively and has been used commercially to produce ion exchange membranes by RAI Research Corporation, Hauppauge, N.Y. and Morgane (Courbevoie Haut de Seine, France). While membranes made via these grafting processes achieve a high degree of selectivity and other desirable transport properties, the properties are difficult to control because of the heterogeneous nature of the reactions used for grafting and the dependence of the membrane's final properties on the morphology of the starting film, which is also very difficult to control. Moreover, preparation of asymmetric structures which are highly desirable for the pressure driven processes is also difficult because of the insolubility of the resulting graft copolymers.

Various monomers and electrophiles have been grafted onto backbone polymers via lithiation followed by anionic grafting. For example, the formation of graft copolymers of poly(2,6-dimethyl- 1,4-phenylene ether) (PPE) and isoprene, methylmethacrylate, hexamethylcyclotrisiloxane or phenyl isocyanate via lithiation and subsequent anionic graft polymerization have been disclosed by Chalk and Hoogeboom, Anionic Graft Polymerization of Lithiated Poly(2,6-dimethyl-1,4-phenylene Ether), J. Poly. Sci.: Part A-1, vol. 7, 2537–2545 (1969).

The addition of a variety of non-monomeric electrophiles to polysulfone via lithiation has been disclosed in *Novel Polysulfones for Membrane Applications*, M. D. Guiver, OKutowy, W. A. McCurdy, I. W. Simpson, Proc. of the Int. Membrane Conf. on the 251th Anniv. of Memb. Res. in Canada, Ottawa, September 1986, 187–202 (NRC Publication No. 26413). U.S. Pat. Nos. 4,797,457 and 4,833,219 disclose substituted polysulfones and a process for prepaxing an aromatic polysulfone via metalating the polysulfone with a metalating agent; and quenching the metelated product with an electrophile so as to replace the metal substitution by an aliphatic or aromatic substituent, a hetero-atom or hetero-atom-containing group, another metal or metal containing group.

SUMMARY OF THE INVENTION

The present invention provides ion exchange membranes comprising a soluble graft copolymer comprising a backbone of a first polymer having a main chain containing aromatic rings and at least one polymerized vinyl or ring compound having ion exchange functionality wherein said polymerized vinyl or ring compound is anionically grafted onto said first polymer on at least one of said aromatic tings or at least one benzylic carbon atom of said aromatic ring, and specific novel graft copolymers are also disclosed.

The present invention also provides a method of making ion selective membranes comprising: (a) forming a copolymer by grafting a monomer which is susceptible to anionic polymerization and which contains at least one functional group which displays ion exchange functionality or can be converted to display ion exchange functionality onto a first polymer having a main chain containing aromatic rings and at least one initiation site on at least one of said aromatic rings or on at least one benzylic carbon atom of said aromatic rings; and (b) forming said membrane by a method selected from the group consisting of solution casting said copolymer, forming from a colloidal dispersion or latex of said copolymer, compression molding of a melt of said copolymer and extruding said copolymer.

The present invention further provides a process for making a soluble graft copolymer comprising the steps of: metallating a polysulfone with a metallating agent at conditions sufficient to produce a metallated first polymer having the general formula:

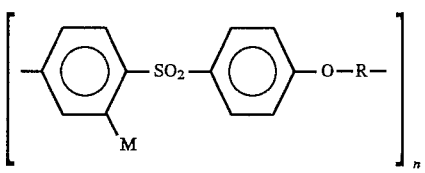

reacting said metallated first polymer with a polymerizable vinyl compound selected from the group consisting of 2-vinylpyridine and 4-vinylpyridine at conditions sufficient to produce said soluble graft copolymer.

The processes of the present invention provide an easy synthesis for the production of a wide variety of ion exchange membranes. By grafting in solution, the properties of both the backbone polymer and the product membrane may be readily controlled. Membranes having properties tailored to a wide variety of separative processes may be produced.

DETAILED DESCRIPTION OF THE INVENTION

The first or backbone polymer may be any polymer containing aromatic rings which remains stable in solution when metallated and can be graft copolymerized. Examples of suitable aromatic rings are benzene, thiophene and naphthalene. Examples of suitable backbone polymers include polysulfones, polyethersulfones, polyethers, polyphenylenethioethers and polyphenylenesulfides. Polysulfones and polyarylethers are the preferred backbone polymers. Where a polysulfone is used any of the polymers falling generally within the class of polysulfone may be used. Udel and Radel polysulfones (Amoco Performance Products) are commercially available examples.

The second component of the copolymers of the present invention is a polymerizable vinyl or ting containing compound which is susceptible to anionic polymerization and which contains or may be modified to contain at least one functional group which displays ion exchange functionality. Examples of suitable ring containing compounds are 1-acylaziridines. Examples of suitable functional groups include nitrogen containing groups, groups which may be converted to nitrogen containing groups after grafting, esters and amides of vinylsulfonic acid and carboxylic acid, and phosphonic acids. When copolymers having anion exchange capabilities are desired, the polymerizable vinyl or ring containing compound is preferably a nitrogen-containing monomer. Suitable nitrogen-containing monomers include acrylonitrile, N,N-dimethylacrylamide, vinylpyridines, such as 2-vinylpyridine and 4-vinylpyridine, alkylvinylpyridines, vinylimidazole and dimethylvinylbenzyl amine. More preferably the nitrogen-containing aromatic vinyl monomer is a tertiary amine and most preferably 2-vinylpyridine or 4-vinylpyridine. Examples of monomers which may be convert include N,N-bis(trimethylsilyl)methylvinylbenzyl amine, methacrylonitrile, N,N-dimethylacrylamide and acrylonitrile. When copolymers having cation exchange capabilities are desired, monomers giving readily sulfonated groups such as styrene, butadiene or vinyl substituted amides and esters of sulfonic, carboxylic and phosphonic acids are preferred. The most preferred precursor to sulfonic acid groups are the n-butyl ester of vinylsulfonic, for carboxylic acid and phosphonic acid, methyl methacrylate and dimethylvinyl phosphonate respectively.

The graft polymerization reaction is carded out in a solvent which dissolves both the first polymer and the polymerizable vinyl or ting containing compound. Under the reaction conditions, the solvent must not react or react only very slowly with the initiator. Hydrocarbons such as benzene, toluene and cyclohexane and ethers such as tetrahydrofuran (THF), dioxane and dimethoxyethane are examples of suitable solvents. Polar ether solvents are preferred and tetrahydrofuran (THF), dioxane and dimethoxyethane are more preferred. THF is the most preferred solvent. The graft polymerization reactions are generally carded out to yield between about 1 and about 20 wt% total copolymer in solution. Preferably the total copolymer is between about 5 wt% and about 15 wt%.

The graft polymerization reaction is generally conducted at temperatures between about −90° C. and about −20° C. although higher or lower temperatures can be advantageous in some systems. Preferably the graft polymerization reaction temperature is between about −78° C. and about −50° C.

In the first step of the reaction, the first polymer is metallated using a suitable metallating agent such as Grignard reagent, aryl or alkyllithium, sodium, potassium, or cesium compound. Butyllithium is preferred. Preferably enough metallating agent is used to metallate between about 5% and about 100% of the first polymer repeat units present. Metallation of more than one site per repeat unit is also possible. Larger mounts of metallating agent can be used when reactive impurities, especially water, are present. When butyllithium is the metallating agent and polysulfone is the first polymer, between about 0.10 and about 0.35 moles of butyllithium per mole of polysulfone is used. Preferably the metallating agent is added to the solvent/first polymer mixture with efficient stirring and over a time period sufficient to insure complete reaction and to redissolve any precipitates formed. Metallation may be carried out at a temperature above or below the graft polymerization reaction temperature. When polysulfone is the first polymer the metallating agent is selectively placed at the ortho surf one position of the phenyl ting to produce a metallated intermediate having the following general formula:

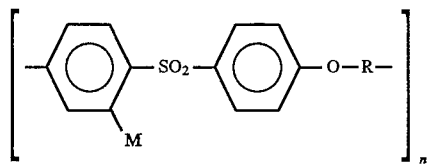

Generally, it is desirable to produce copolymer with from about 15 % to 50% by weight of the functionalized monomer, which yields a final product having an ion-exchange capacity of between about 0.5 and about 5.0 meq/g and more preferably between about 1.0 and 3.0 meq/g. Below this mount, the material will not be very swollen by water and will consequently not exhibit any ion-exchange functionality. Higher capacities will give highly swollen materials or even water soluble polymers. Even if crosslinking is used to reduce swelling, very high capacity materials will generally produce membranes having inferior mechanical properties.

Monomer addition can generally be made quite rapidly. Usually the reaction temperature is chosen to give complete reaction within 10–30 minutes. Extended reaction times are not usually beneficial and encourage undesirable side reactions. Normally polymerization is terminated by addition of relatively acidic compounds such as alcohols or carboxylic acids. The resulting copolymers are soluble in at least one solvent at temperatures between about room temperature and the boiling point of the solvent. General classes of suitable solvents include amides, ethers, alcohols. Preferably the solvent is selected from DMF, NMP, tetrahydrofuran (THF) and diglyme.

Often there is no need to isolate the graft copolymer. Membranes can be cast directly from the polymerization mixture or after the concentration of polymer is adjusted by evaporation or by addition of the same or a new solvent. Filtration or centrifugation can be used to remove residues of the initiator to improve the homogeneity of the membranes.

It may be desirable to replace the solvent used for the reaction with another more suitable for casting. Volatile solvents such as THF are easily replaced by less volatile solvents such as DMF by adding the desired amount of the less volatile solvent all at once or in portions and evaporating or distilling out the more volatile solvent. Solvent replacement may also be used when it is desired to perform subsequent reactions on the graft copolymer.

When purification is desired, any of the methods generally known in the art may be used. Evaporation of the solvent followed by extraction with one or more polymer non-solvents that dissolve the impurities or precipitation of the reaction mixture into a non-solvent for the copolymer are preferred. Precipitation of the polymer can also be combined with a chemical transformation. For example, sulfonate esters can be hydrolyzed by addition to hot aqueous acid. In certain polymerization systems, some homopolymer may form. When this is the case, it is especially preferred that the precipitant for the graft copolymer be a solvent for the homopolymer.

The graft copolymer can be used directly for forming the ion exchange membranes of this invention. For example, graft copolymers of 4-vinylpyridine on polysulfone can be used to make anion exchange membranes for electrodialysis that have excellent transport properties when used in aqueous strong acids such as HCl or sulfuric acid. Generally, however, the group needed to impart ion exchange properties to the copolymer is not compatible with the anionic polymerization system used to form the graft copolymer. Thus, it is usually necessary to perform some transformation of the polymer to obtain the ion exchanger. This transformation may be advantageously performed either before or after the formation of the polymer into the sheet or other shape needed for the membrane. Reaction before formation of the final shape is generally preferred since it is easier to control the reaction and properties of the resulting membrane. However, frequently the solubility of the ion exchanger is less than the precursor and transformation after membrane fabrication is more desirable. Even when both the product and precursor are soluble, morphology of films cast from the precursor or ion exchanger may differ and there are advantages to forming the membrane from either.

The following are typical of the kinds of transformations that can be used to convert graft copolymers that are readily produced by anionic polymerization into ion exchangers. Carboxylic esters and amides may generally be hydrolyzed by either aqueous acid or base. Addition of an organic cosolvent can often speed the reaction. Examples of such transformations include:

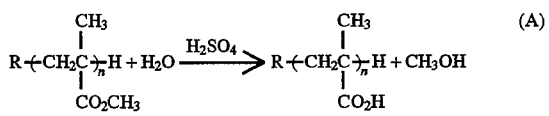

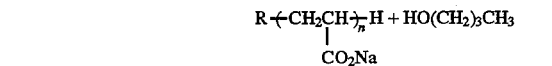

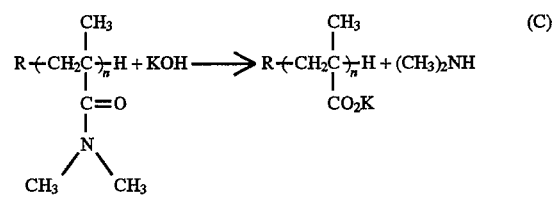

The salt produced by base hydrolysis can be easily converted to the acid form by exchange with a strong acid. Generally, when a soluble material is needed for subsequent solution casting, the free acid is preferred because it is more readily soluble.

Sulfonate esters can be hydrolyzed by either acid or base. Nucleophiles such as amines can also be used to hydrolyze sulfonate esters. Sulfonamides generally require acid for hydrolysis. Examples of the foregoing transformations include:

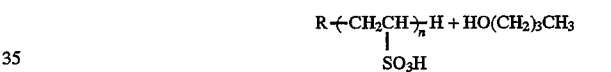

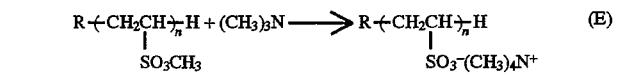

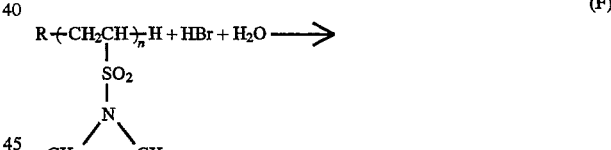

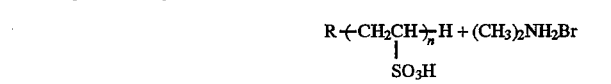

The acid form is preferred for subsequent casting because of its generally better solubility. Conversion to ammonium or amine salts can also be advantageous in increasing solubility. In general, the membrane properties that are obtained depend to some degree on the ionic form in which the exchanger is cast and experimentation with ionic form to optimize properties may be required.

Phosphonic acid esters are readily hydrolyzed by acids or the action of trimethylsilyl iodide, for example:

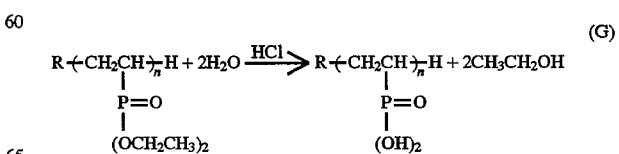

Conversion of amines to strong base ion exchangers is generally accomplished with alkylating agents such as alkyl halides or dimethylsulfate. Tertiary amines are converted in a single step while primary or secondary amines may require several sequential alkylations. Suitable amine transformations include:

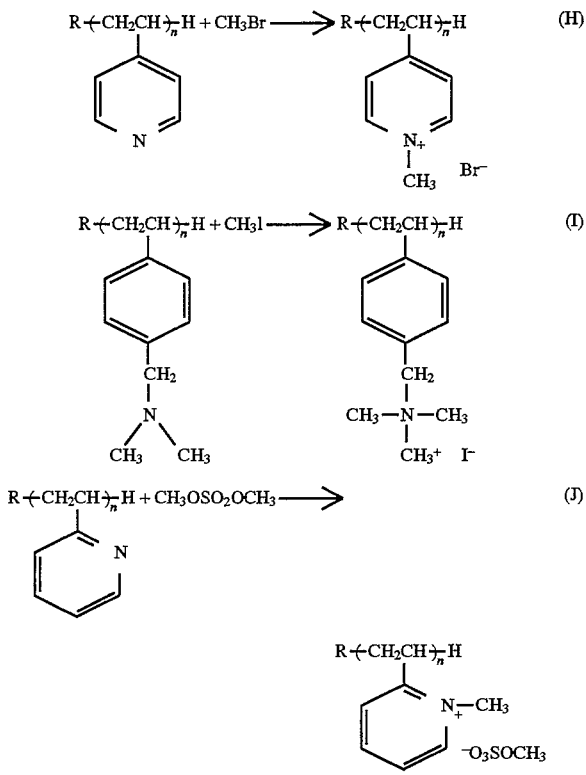

Sometimes it is advantageous to perform additional reactions. For example, hydrogenation can be used to convert the aromatic pyridine compounds to aliphatic piperidines which subsequently can be quaternized. Reduction of dimethyl acrylamide and subsequent quarternization represents another route to strong base ion-exchangers. Examples of such transformations include:

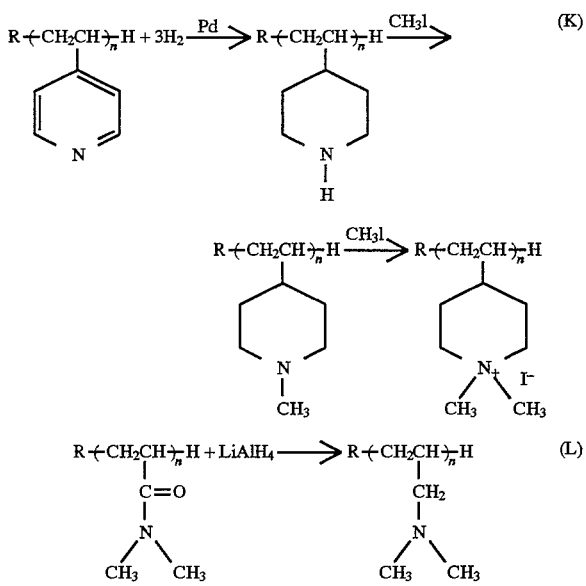

Often the preferred reagent for transformation to the ion exchanger will depend on the chemical stability of the backbone polymer. Base hydrolysis should be avoided with a polysulfone backbone but it is acceptable with polyphenylene ether.

Compatible blends of the graft copolymer with the backbone or similar copolymer also may be used to form membranes. Blends offer the opportunity to adjust the hydrophilic-hydrophobic balance which greatly affects the transport properties after the graft copolymer has been synthesized. Blending also offers the opportunity to reduce the amount of the more expensive graft copolymer per unit membrane area. When a blend is to be used, the graft copolymer can be transformed either in the presence of the blending polymer or the blending polymer can be mixed in after the ion exchange functionality is incorporated into the graft copolymer. Blends of different ion exchange graft copolymers may also be made. These may be: 1) blends of the same copolymers with different ion exchange content, 2) blends of different graft copolymers of the same type of functionality (i.e. both anion exchange or both cation exchange) or 3) blends of oppositely charged ion exchangers or ion exchange precursors. In case 2), blends of phosphonic acids and sulfonic acids or their precursors could be made. In case 3), blending the opposite functionality polymers together when at least one of them which has not yet been converted to an ion exchanger offers the opportunity to obtain membranes having three distinct phases after introducing the ion exchange functionality: backbone, anion exchange and cation exchange. If both of the polymers have been converted to their ion exchanging functionality before blending, the charge domains will be of the polyelectrolyte complex type with the backbone making the polymers insoluble in all types of aqueous media and acting as a reinforcing matrix to improve mechanical properties.

Another reactive transformation that can be made on the ion exchanger or its precursor is the addition of a crosslinking agent. For example a graft copolymer of polysulfone and 4-vinylpyridine can be mixed with a monoakylhalide such as methyl iodide and/or a dialkylhalide, such as diiododecane. Membranes formed from this mixture will be crosslinked via the difunctional alkylating agent. Alternatively, polysulfone grafted with 4-vinylpyridine could be reacted by controlling stoichiometry, time and/or temperature to give a material in which only some of the amine functionality has been converted to quaternary ammonium groups. Addition of dialkylhalide or other amine reactive compounds such as epoxy resin to the casting mixture can give crosslinked membranes. Although crosslinking is generally unnecessary, it can be used to control water swelling and to help stabilize the structure. This is especially important in systems that undergo slow chemical transformations which result in breaking the ion-exchanger polymer chains.

Membranes can be formed from these graft copolymers by a variety of techniques. Casting from solution is preferred, but formation from colloidal dispersions or latexes or from melts by compression molding or extrusion are also possible. For the latter processes, processing the non-ionic precursor is preferred.

When preparing membranes from solution, either symmetric or asymmetric structures may be more appropriate depending on the end use of the membrane. Membranes intended for the electrolytic processes are generally symmetric although they could consist of several different layers as are found, for example, in bipolar membranes. Membranes for pressure driven processes are generally asymmetric with a thin, dense layer over a thicker porous supporting structure. This allows the maximum flux (which is inversely related to thickness) while retaining the high selectivity of the dense layer. Methods to form membranes of both types are well known in the art.

Reinforcement materials may be used to add further mechanical stability, and are common for membranes used in non-electrically driven processes. Typically, reinforcement materials comprise a microporous structure of, for example, polysulfone or polyacrylonitrile. Coating of such structures with polymer solutions or dispersions is also well known in the art. Properties of the resulting membranes are controlled by such variables as solvent composition, additives to the solvent, evaporation time and temperature and polymer concentration.

Various post-treatments could be applied to the membranes to alter or stabilize the properties. These include, but are not limited to, reaction with compounds that react with the functional groups to induce crosslinking, irradiation, for example by electron beam, to induce crosslinking and contact with electrolyte solutions of various concentrations, generally at elevated temperature. Depending on the starting membrane these treatments can either reduce porosity or increase the water content.

In addition to forming sheets of material by casting, spinning can be used to form hollow fibers or tubes. Hollow fibers or tubes of porous supports can also be coated with graft copolymer to make membranes.

EXAMPLE 1

Unquaternized polysulfone grafted with 2-vinylpyridine was produced by the following process. The unquaternized copolymer was used to form a membrane. A 200 mL 3-neck round bottomed flask fitted with overhead stirrod with teflon paddle, valved gas adapter leading to argon source, and rubber septum was flame-dried under vacuum and cooled under argon purge. Anhydrous THF (75 mL) was cannulated in followed by Udel P1700 polysulfone (6.2 g, 0.014 mole). After dissolving, the solution was cooled to $-71°$ C. and 2.9 mL of 2.4M solution of n-BuLi in hexanes (0.007 mole) was added dropwise over 4 minutes. After stirring for 18 minutes, 1.29 mL 2-vinylpyridine (0.012 mole) was added over approximately 10 seconds to the solution, then at $-69°$ C. After 17 minutes the temperature of the viscous, slightly cloudy, amber solution reached $-63°$ C. Ethanol-d (1.0 mL, 0.017 mole) was then added with an instant drop in viscosity, producing a clear, light orange solution of copolymer.

The copolymer from the reaction solution was precipitated by pouring a thin stream of the solution into 400 mL (5 volumes) briskly stirred deionized water. After 15 minutes stirring the free white fibers were vacuum-filtered on Whatman #40 filter paper. Dispersing the product twice in 200 mL water, followed by filtration, gave damp, easily handled fibers with no vinylpyridine odor. These were dried at 113° C. to give 7.1 g polymer. Gas chromatography indicated 100% reaction. Elemental analysis (%N) indicated 1.67 mmol N/g, suggesting that a graft copolymer of 2-vinylpyridine on polysulfone was produced.

5 g of the polymer was dissolved in 30 mL of DMF. The solution was spread with a casting knife set at 30 mils on a glass plate. After standing 2 minutes at room temperature the plate was heated in a forced convection oven at 125° C. for 15 minutes. The membrane was soaked in dilute HCl for 3 minutes to release it from the plate. Annealing in 1N HCl at 70° C. overnight gave a membrane 3.1 mils thick.

EXAMPLE 2

Unquaternized polysulfone grafted with 4-vinylpyridine copolymer and an ion exchange membrane were produced by the following procedure. A 2000 mL 4-neck round-bottomed flask fitted with an overhead stirrod/paddle, valved gas adapter leading to a pump and source of argon, and two rubber septa were flame-dried under vacuum and then cooled under argon purge. Anhydrous THF (1100 mL) was added followed by 100 g dry Lidel Polysulfone (0.2262 mol r.u.). After 2 hours, the solution was cooled to $-68°$ C., and 31.7 mL 2.5M n-butyllithium (0.08 mol) in hexanes was added over 9 minutes by syringe. Seventeen minutes later 12.92 g (0.123 mol) 4-vinylpyridine was added from a tared syringe over 1.5 minutes. After 14 minutes of reaction at $-68°$ C. to $-61°$ C., the viscous but stirrable solution was quenched with 6.0 mL ethanol-d (0.1 mol) by syringe. The resulting reddish-orange solution was stirred for 20 minutes before GC sampling, which showed 100% reaction. A solution of 4.6 mL (0.08 mol) glacial acetic acid in 5 mL THF was then added dropwise, and the solution allowed to stir overnight under argon while gradually warming to room temperature.

The copolymer from the reaction solution was precipitated by pouring a thin stream of the solution into 5.5 L of briskly stirred deionized water. After 15 minutes stirring, the free white fibers were vacuum-filtered on Whatman #40 filter paper. Dispersing the product twice in 2000 mL water, followed by filtration, gave damp, easily handled fibers with no vinylpyridine odor. These were dried at 113° C. to give 110.2 g polymer. The yield was 110.2 g (97+%). Elemental analysis showed that the product contained 1.51% N or 1.08 mmol N/g indicating that a graft copolymer of 4-vinylpyridine on polysulfone was produced.

Ion exchange membranes were cast according to the procedure described in Example 1.

EXAMPLE 3

Polysulfone-graft-4-vinylpyridine was quaternized and cast into strong base ion exchange membranes by the following procedure.

A 12L 3-neck round-bottomed flask was fitted with heating mantle, septum, thermocouple, temperature controller probe and an overhead stirrer with a large Teflon paddle. The temperature was controlled by a proportional electronic temperature controller. The flask was charged with 900 g of polysulfone polymer containing 1.18 mmol of N/g synthesized by the procedure of Example 2 except that the ratio of 4-vinylpyridine to polysulfone was increased to 14.1 g/100 g. The polymer was stirred with 7707 mL of DMF to give a slightly cloudy solution. The solution was heated with good stirring to 116° C. causing it to become clearer. It was then cooled over several hours to 61° C.

Methyl iodide (226 g; 1.593 mol) was added over 1 minute. The temperature increased several degrees. The solution gradually became more viscous and its color turned to dark green. The reaction was continued at about 60° C. for 1.5 hours. A vacuum-distillation column was added to the flask. The pressure was gradually reduced until distillation commenced. After 150 mL of distillate was collected the copolymer solution contained 12.6 w/w % solids and <0.1% residual MeI based on gas chromatography. The surfactant FC-430, (3M Corporation) (17 g) dissolved in a few mL of DMF, was then stirred in well and the solution (8.6 kg) was faltered through 80 mesh steel screen, to remove a very small amount of gel.

A portion of this solution was poured onto a clean, level glass plate and drawn down the plate in one motion with an 8" casting knife set to 30 mils. After standing 2 minutes at room temperature, the plate was heated in a forced convection oven at 125° C. for 15 minutes. The membrane was soaked in dilute HCl for 3 minutes to release it from the plate. Annealing in 1N HCl at 70° C. overnight gave a membrane 3.1 mils thick.

EXAMPLE 4

Polysulfone-graft-4-vinylpyridine was blended with polysulfone, quaternized and cast into strong base ion exchange membranes by the following procedure.

Equal amounts (400 g) of a copolymer (1.81 mmol N/g) produced according to Example 2 using a 4-vinylpyridine to polysulfone ratio of 21.4 g 4-vinylpyridine/100 g polysulfone and Udel P1835 polysulfone (Amoco performance) were placed in a 12L round-bottomed flask. DMF (4900 mL) and NMP (650 mL) were added and dissolved with stirring at 25°–120° C. The solution was perfectly clear and yellow-orange after stirring for 2 hours at 120° C. After cooling to 60° C., 204 g of methyl iodide (1.9 mol/mol VP) was added and the temperature held at 60° C. The solution took on a greenish-yellow opalescence. After 3.5 hours, the reaction mixture was cooled to 25° C., and 1250 mL DMF added.

Some DMF and excess MeI were removed by vacuum distillation giving a 13% solids solution with a viscosity of 600 cps.

Membranes were caste by the procedure of Example 3.

EXAMPLE 5.

The electrical resistance of membranes prepared by the general procedures of Examples 1 through 4 were measured according to the following procedure. A four compartment electrodialysis apparatus was used to measure the properties of the membranes. The cell was constructed of four sections of Teflon pipe having an inside cross-sectional area of 11 cm$^2$ held between two flat end plates. Each of the sections of pipe was equipped with two small tubes which served as inlet and outlet so that solution could be pumped through each section. The end plates were equipped with platinum electrodes attached to a DC power supply. The two central sections were equipped with voltage probes, small Ag/AgCl electrodes inserted through the walls of the pipe into the interior volume. To make the measurements, three membranes were placed between the sections of Teflon pipe. Bolts through the corners of the endplates were then tightened to hold the apparatus together. The two outer membranes were Nafion 110 (DuPont). The test membrane occupied the central location. Thermoregulated (30° C.) 0.5M HCl was drawn from a reservoir and circulated through the two inner compartments via a tubing pump and Tygon tubing. A separate solution of 0.5M $H_2SO_4$ was circulated through the outer electrode rinse compartments. The voltage at 5 current levels between 0.05 and 1.20A with and without the test membrane in place were recorded. The ohmic resistances of the solution plus membrane and the solution alone were calculated from the current-voltage profile according to Ohm's law, Resistance=Voltage/Current. The difference between the two resistances was multiplied by the surface area to calculate an areal resistance as shown by the equation below.

$$AR(\Omega\text{-cm}^2) = (R_{m+s} - R_s) \times 11 \text{ cm}^2$$

The test was repeated using each of the unquaternized membranes listed in the first column of Table 1, below. Resistances are shown in the fourth column of Table 1, below.

EXAMPLE 6

Electrical current efficiency with 1N HCl for a series of membranes prepared by the general procedure of Examples 1 and 2 were measured in a 4-compartment cell having the same configuration as Sodium chloride solution was circulated through the inner compartment on the cathodic side from a reservoir containing about 200 mL 1M sodium chloride solution and a pH electrode. About 300 mL of 1 N hydrochloric acid was circulated on the other side of the anion membrane. A solution of 0.5M $Na_2SO_4$ was circulated through the outer electrode rinse compartments. A direct current (1.2 A) was passed across the cell. Ideally, the current should be carried across the test membrane by chloride ions. However, some of the current was carried by hydrogen ions migrating from the anode side to the cathode side of the test membrane. Thus, the 1M NaCl solution tended to gradually become more acidic. A slight excess of 1N NaOH was added to the 1M NaCl and the solution was allowed to readjust to pH 7.0. The time at which pit 7.0 was reached was noted and 1.0 mL of standard 1.0N sodium hydroxide was added. The time interval needed to reach pH 7.0 again was noted. This experiment was repeated at least three times, and values which agreed within 1 second were averaged ($t_{sec}$). The current was then turned off and the cell was drained. The test was repeated for each of the membranes listed in Table 1. The current efficiency of the ration membrane for 1N HCl at 101 A/ft$^2$ is given by:

Eff.(%)=[1–(96.5 faradays/meq.×1.0 meq. NaOH added/1.2A× $t_{sec}$)]×100

The efficiencies for 1N HCl are listed in Table 1, column 5.

TABLE 1

| Membrane | Capacity (mmol N/g) | Thickness (mils) | Areal Resistance 0.5M HCl ($\Omega$-cm$^2$) | Efficiency 1N HCl |
| --- | --- | --- | --- | --- |
| Example 1 | 1.80 | 3.0 | 4.7 | 77% |
| Example 1 | 1.60 | 3.0 | 15.5 | 76% |
| Example 2 | 1.81 | 3.2 | 1.0 | 82% |
| Example 2 | 1.70 | 4.5 | 2.7 | 84% |
| Example 2 | 1.60 | 3.0 | 2.2 | 89% |
| Example 2 | 1.44 | 3.1 | 2.5 | 94% |
| Example 2 | 1.18 | 3.0 | >20 | — |
| Aquatech[1] | — | 5.0 | 1.5 | 57% |
| AMP[2] | — | 4.6 | 4.0 | 67% |

[1]Prepared by the method used for the anion layer of Example 1 of U.S. Pat. No. 4,766,161.
[2]Asahi Glass, Inc.

Each of the membranes prepared according to Examples 1 and 2 were cast from a 15% solution in DMF. The second membrane produced according to Example 1 (2-vinylpyridine graft third row) and the fifth membrane produced according to Example 2 (4-vinylpyridine graft, eighth row) display resistances which are much higher than the remaining listed membranes which have higher capacities. Thus, capacities of above 1.8 mmol N/g are generally preferred for the 2-vinylpyridine grafts, and capacities greater than about 1.3 mmol N/g are generally preferred for 4-vinylpyridine graft copolymers. The results listed in Table 1, above clearly show that the ion exchange membranes produced according to the procedures of Examples 1 and 2 are suitable weak base anion exchange membranes. Moveover, because the grafting reaction is performed in solution the properties of the resulting membranes are much easier to control than with prior grafting onto film reactions.

EXAMPLE 7

The resistance test of Example 5 was repeated, except that 0.5N HCl and then 0.5M $Na_2SO_4$ was used as the electrolyte and each of the quaternized membranes listed in the first column Table 2, below was used as the test membrane. The resistances are shown in the fourth and fifth columns of Table 2, below.

EXAMPLE 8

The current efficiency test of Example 6 was repeated except that the membranes listed in Table 2, below were used. The efficiencies for 1N HCl are listed in Table 2, column 6.

The sodium chloride solution in the salt compartment was replaced by sodium sulfate and the 1N HCl in the acid compartment was replaced with 1N $H_2SO_4$. The current efficiencies for 1N $H_2SO_4$ were measured as above, and are shown in column 7 of Table 3.

EXAMPLE 9

The same apparatus and general procedure as used in Example 7 was used to measure the fouling rate of the membranes listed in Table 2, except the 0.5M $Na_2SO_4$ in contact with the test membranes contained 0.1% sodium lauryl sulfate. As soon as the current of 0.6 A was switched on the voltage was recorded. Additional voltage readings were recorded at ten second intervals for the next one to two minutes. The fouling rate was determined from the initial slope of the line in a time-voltage plot.

gen. 8 g (0.006 mole) of purified PPE powder (MW 64,400, SUMITOMO) was charged, then 400 mL of anhydrous tetrahydrofuran (THF) was cannulated into the flask. The mixture was warmed to 50° C. with stirring and became a clear, yellowish solution. After the solution was cooled to room temperature, 6.8 mL of n-BuLi solution (1.6M in hexane) was injected dropwise into the flask through the septum. The solution turned dark orange. It was stirred for 1 hour to ensure complete lithiation.

A small portion, 15 mL, of lithiated PPE solution was cannulated into a well dried 25 mL Edenmeyer flask, containing 0.6 mL of freshly distilled chlorotrimethylsilane in 10 mL anhydrous THF. After stirring for 30 minutes, trimethylsilylated PPE was precipitated, washed with methanol, and vacuum dried at 50° C. overnight. $^1$H-NMR analysis of this product showed that the trimethylsilyl groups were all located on the benzyl carbon of the polymer. This strongly suggests that this is the major position for initiation of the graft polymerization.

After taking the small sample, the remaining solution was chilled to −40° C. 3.9 g (0.0235 mole) of n-butylvinylsulfonate was quickly injected using vigorous agitation. The reaction mixture became bright orange immediately. After one hour, the reaction was terminated with 5 mL of methanol.

The reaction mixture was slowly poured into 1500 mL of briskly agitated methanol, which is a solvent for poly(n-

TABLE 2

| Membrane[1] | capcty (mmol N/g)[1] (a) | thick- ness (mils) | areal resist. 0.5N HCl ($\Omega$-cm$^2$) | areal resist. 0.5M Na$_2$SO$_4$ ($\Omega$-cm$^2$) | Eff. 1N HCl | Eff. 1N H$_2$SO$_4$ | Initial foul. rate[2] (V/sec) |
|---|---|---|---|---|---|---|---|
| Example 3 | 1.6 | 4.0 | 1.8 | 3.7 | 75% | — | .004 |
| Example 4 | 1.81 | 3.2 | 1.4 | 2.2 | 59% | 72% | .0005 |
| Example 4 | 1.6 | 3.2 | 3.8 | 6.4 | 72% | 82% | .001 |
| Example 4 | 1.44 | 3.1 | 0.9 | 1.7 | 57% | 75% | .0002 |
| Example 4 | 1.3 | 3.3 | 3.2 | 6.4 | 64% | 83% | .0002 |
| Example 4 | 1.21 | 3.0 | 2.1 | 3.9 | 63% | 84% | .003 |
| Example 4 | 1.18 | 2.4 | 1.5 | 3.0 | 69% | — | — |
| Example 4 | 1.08 | 3.8 | 4.8 | 8.7 | 65% | — | .003 |
| blend 4 | — | 1–2 | — | 2.5 | 68% | — | — |
| Aquatech | — | 5.0 | 1.4 | — | 57% | 74% | ≧.1 |
| RA1 4035 | — | 3.5 | 1.4 | — | 43% | 73% | .002 |
| AMP | — | 4.6 | 4.0 | — | 67% | 83% | .01 |

[1]quaterization performed in DMF solution with MeI before casting or "post-quaternized" after casting by immersion of annealed and then neutralized film into 5% methyl iodide in alcohol.
[2]measures initial voltage rate increase at 55 mA/cm$^2$ with 0.1% sodium lauryl sulfate/0.5M sodium sulfate.
[3]50/50 blend of 1.81 mmol N/g PSU-g-4VP with Udel P1835 polysulfone.
(a) base polymer before quaterization.

Thus, strong base anion exchange membranes suitable for use in electrodialysis were produced. Moreover, many of the membranes cast from 4-vinylpyridine graft copolymer display fouling rates which are an order of magnitude less than the best of the commercially available membranes (RA14035) which were tested.

EXAMPLE 10

Preparation of poly(2,6-dimethylphenylene ether) (PPE) grafted with poly(n-butyl vinylsulfonate) (PPE-g-PBVS).

A 500 mL 3-necked round bottomed flask was equipped with overhead stirring rod/Teflon paddle, thermometer, nitrogen inlet/outlet and rubber septum. It was flame-dried under vacuum and cooled to room temperature under nitrobutylvinylsulfonate) homopolymer (PBVS), but not for the copolymer. Precipitated polymer was collected by Filtration, washed with methanol and vacuum dried at 50° C. overnight. The yield was 10.6 g.

Elemental analysis showed that the copolymer contained 6.1% sulfur. It dissolved readily in chloroform and chlorobenzene at room temperature and in N-methylpyrrolidone (NMP) at elevated temperature. Both $^1$H- and $^{13}$C-NMR spectra showed bands characteristic of PPE and PBVS. Absorption bands in the infrared spectrum at 1350 and 1190 cm$^{-1}$ not present in PPE indicate the presence of —$SO_3$— groups in the polymer, indicating that PPE-g-PBVS graft copolymer was produced.

EXAMPLE 11

PPE-g-PBVS with a sulfur content of 9.3% was prepared by the method of Example 10. A 12 wt% solution of the polymer was spread on a glass plate with a doctor blade set to 30 mils and dried at 70° C. for 30 minutes. The film was hydrolyzed to the sulfonic acid by boiling in 20% aqueous HCl for 3 hours. The hydrolyzed film had a water uptake of 32 wt %. The ion exchange capacity after hydrolysis, determined by titration with NaOH, was 2.5 meq/g, indicating that hydrolysis was about 86% complete.

EXAMPLE 12

The areal resistance of the membrane of Example 11 was measured (according to the procedure of Example 6) to be 2.4 $\Omega.cm^2$ in 0.5M $Na_2SO_4$.

EXAMPLE 13

The current efficiency of the membrane of Example 11 was measured using the following procedure. A cell consisting of a cation exchange membrane of the present invention interposed between two Nafion® 110 cation exchange membranes and four separators formed a 4-compartment cell which was placed between two electrodes. The exposed membrane area of the cation exchange membrane being tested was 11 cm². The anode rinse compartment (formed by the anode and a Nafion® 110 membrane) was charged with 1 liter of 0.5M $Na_2SO_4$. The salt compartment (formed by the Nafion® 110 membrane of the anode rinse compartment and one side of the cation membrane being tested) was charged with 200 mL of 1M NaCl. The base compartment (formed by the Nafion® 110 membrane of the cathode rinse compartment and the other side of the cation membrane being tested) was charged with 200 g of 15% NaOH. Solutions were circulated through the cell by pumps. A pH probe was placed in the salt compartment. A direct current of 1.2 A was passed. About 1.0 mL of a standard solution of 1 N HCl was added to the salt solution to reduce the pH to about 1.5. As OH⁻ ions leaked through the cation membrane being tested, the pH in the salt solution rose. When the pH reached 7, 1.0 mL of the standard HCl solution was added to the salt compartment and the time interval to return the pH in the salt compartment to 7 was recorded. From the data collected by this procedure, the current efficiency for Na⁺ transport at 15% NaOH in the base compartment was calculated from the following equation:

$$\text{Eff}(\%) = [1-(96.5 \text{ faradays/meq.} \times 1.0 \text{ meq. HCl added}/1.2 \text{A} \times t_{sec})] \times 100$$

The current efficiency was 60% with 15wt% NaOH at 30° C. Thus cation membranes having good electrodialytic transport properties (resistance and current efficiency) were produced. Moreover, because of the homogeneous nature of the grafting reaction the properties of the resulting membranes may be easily controlled compared to prior grafting on film methods.

EXAMPLE 14

Preparation of polysulfone grafted with poly(n-butylvinylsulfonate) (PSU-g-PBVS).

A 250 mL, 3 necked round bottomed flask, removed from a 130° C. oven, was assembled under nitrogen with thermometer, $N_2$ inlet/outlet, rubber septum and magnetic stirrer. 4.4 g (0.01 mole) of purified polysulfone Ctldel, P1700, MW 35,000, AMOCO) was placed in the flask and then 150 mL of freshly distilled THF was added by cannulation. After complete dissolution of the polymer at room temperature, the flask was immersed in a −78° C. bath. At −70° C., 1.6 mL of 1.6M n-butyllithium solution in hexane was injected dropwise through the septum. The reaction mixture was held at −70° C. for 10 minutes. 5.0 g (0.03 mole) of n-butylvinylsulfonate monomer was then injected rapidly with vigorous stirring. The reaction was kept at −70° C. for 0.5 hour, then terminated by adding 1 mL methanol.

The reaction mixture was slowly poured into 500 mL of methanol with agitation. White, fibrous polymer was precipitated, and repeatedly washed with methanol to remove any poly(n-butylvinylsulfonate) homopolymer that might have been present. The purified copolymer, after drying under vacuum at 60° C. overnight, weighed 5.0 g. $^1$H-NMR analysis of the polymer showed new resonance peaks in the aliphatic regions of 1–2 ppm and 4.4 ppm due to n-butyl groups of the sulfonate ester.

The above polymer (3.0 g) was hydrolyzed by stirring in an acidic water/methanol mixture (1:9 by volume) at 60° C. for 2 hours. The infrared spectrum of the acid polymer showed a strong absorption in the O—H vibration region (3600–3300 $cm^{-1}$), indicating that the PSU-g-PBVS graft copolymer was produced.

We claim:

1. An ion membrane comprising a solution cast graft copolymer, said graft copolymer comprising a first polymer having a main chain containing aromatic rings and at least one initiation site on at least one of said aromatic rings or on at least one benzylic carbon atom of said aromatic rings; and at least one polymerized vinyl or ring containing compound having ion exchange functionality selected from the group consisting of sulfonic acid groups, phosphonic acid groups, ammonium groups and amine groups grafted thereto, wherein grafting takes place in solution, said polymerized vinyl or ring containing compound being anionically grafted onto said first polymer at the at least one said initiation site before casting the ion exchange membrane from said solution, wherein initial fouling rates for said ion exchange membrane are less than or equal to 0.04 volts/sec.

2. The ion exchange membrane of claim 1 wherein said first polymer is selected from the group consisting of polysulfones, polyethers and polyphenylenes.

3. The ion exchange membrane of claim 1 wherein said at least one polymerizable vinyl containing compound contains at least one functional group selected from the group consisting of nitrogen containing groups, groups which may be converted to nitrogen containing groups after grafting, styrene, butadiene, esters and amides of vinylsulfonic acid, vinylphosphonic acid, and phosphonic acids.

4. The ion exchange membrane of claim 3 wherein said at least one polymerizable vinyl containing compound is a nitrogen containing monomer selected from the group consisting of acrylonitrile, dimethylacrylamide, vinylpyridines, vinylimidazole and dimethylvinylbenzyl amine.

5. The ion exchange membrane of claim 4 wherein said at least one polymerized vinyl containing compound is added as a monomer selected from the group consisting of N,N-bis(trimethylsilyl)methylvinylbenzyl amine, methacrylonitrile, N,N-dimethylacrylamide and acrylonitrile.

6. The ion exchange membrane of claim 3 wherein said at least one polymerized vinyl compound is an ester or amide of vinylsulfonic, carboxylic or phosphonic acids selected from the group consisting of n-butyl ester of vinylsulfonic acid, methyl methacrylate and dimethylvinyl phosphonate.

7. The ion exchange membrane of claim 3 wherein said polymerized vinyl containing compound is styrene.

8. The ion exchange membrane of claim 7 wherein said styrene is converted to an ion exchange material after grafting via reaction with $SO_3$ followed by hydrolysis.

9. The ion exchange membrane of claim 7 wherein said styrene is converted to a cation exchange material after grafting via reaction with a compound selected from the group consisting of sulfur trioxidetriethylphosphate complex, acetylsulfate, chlorosulfonic acid, chloromethyl methylether, formaldehyde and HCl and bromomethyloctylether, followed by reaction with an amine.

10. The ion exchange membrane of claim 1 wherein between about 15% to about 50% by weight of said copolymer is said polymerized vinyl or ring containing compound.

11. The ion exchange membrane of claim 1 wherein said membrane has an ion exchange capacity between about 1.0 and about 3.0 meq/g.

12. The ion exchange membrane of claim 4 wherein said first polymer is polysulfone, said polymerized vinyl or ring containing compound is selected from the groups consisting of 2-vinylpyridine and 4-vinylpyridine such that the resulting membrane is an electrodialysis anion exchange membrane.

13. The anion selective membrane of claim 12 wherein said polymerizable vinyl compound is grafted onto less than about 0.2 addition sites per polysulfone monomer.

14. The ion exchange membrane of claim 1 wherein said first polymer is polyphenylene ether, said polymerized vinyl or ring compound is selected from the group consisting of styrene, butadiene, n-butyl ester of vinyl sulfonic acid, methyl methacrylate and dimethylvinyl phosphonate and said membrane displays cation exchange capabilities.

15. The anion selective membrane of claim 13 further comprising between about 20 and about 60 weight percent ungrafted polysulfone.

* * * * *